United States Patent [19]

Savignano et al.

[11] Patent Number: 5,653,054

[45] Date of Patent: Aug. 5, 1997

[54] PROCESS FOR PREVENTING FROST FORMATION ON PLANTS

[75] Inventors: Joseph P. Savignano, Murrells Inlet, S.C.; Joseph W. Hanafin, Marlborough, Mass.

[73] Assignee: Frost-B-Gone, Inc., Pelham, N.H.

[21] Appl. No.: 551,114

[22] Filed: Oct. 31, 1995

[51] Int. Cl.⁶ ................................................ A01G 13/00
[52] U.S. Cl. ................................................ 47/2; 252/70
[58] Field of Search ................................................ 47/2; 252/70

[56] References Cited

U.S. PATENT DOCUMENTS

| | | | |
|---|---|---|---|
| 3,180,056 | 4/1965 | Lammerts | 47/2 CCB |
| 3,584,412 | 6/1971 | Palmer | 47/2 CCB |
| 3,940,356 | 2/1976 | Byrnes | 26/29.6 |
| 3,965,615 | 6/1976 | Antonio | 47/2 CCB |
| 4,086,331 | 4/1978 | Neumann | 47/2 CCB |
| 4,358,389 | 11/1982 | Lumer et al. | |
| 4,698,172 | 10/1987 | Tye et al. | 252/70 |
| 4,954,279 | 9/1990 | Ma et al. | 252/70 |
| 5,118,435 | 6/1992 | Nieh | 252/70 |
| 5,273,673 | 12/1993 | Ashrawl | 252/70 |
| 5,385,688 | 1/1995 | Miller et al. | 252/73 |

FOREIGN PATENT DOCUMENTS

| | | | |
|---|---|---|---|
| 1046392 | 12/1958 | Germany | 47/2 CCB |
| 9224629 | 12/1984 | Japan | 47/2 CCB |
| 3157922 | 6/1988 | Japan | 47/2 CCB |
| 479460 | 12/1975 | U.S.S.R. | 47/2 CCB |
| 957794 | 9/1982 | U.S.S.R. | 47/2 CCB |

OTHER PUBLICATIONS

Hort Science vol. 28 p. 343—Antitranspirant and cryoprotectant do not preven peach freezing injury 1993.

Hort Science vol. 27 pp. 26–27—Two patative cryoprotectants do not provide frost and freeze protection in tomato and pepper 1992.

Proceedings of the Florida State Horticultural Society vol. 101 pp. 251–253 published 1989.

*Primary Examiner*—Henry E. Raduazo
*Attorney, Agent, or Firm*—Perman & Green

[57] ABSTRACT

A process for preventing or retarding frost formation on substrates such as grass or leafy plants is disclosed. The process involves spraying the surfaces of these substrates with a frost prevention composition comprising a mixture of water, a water-soluble freezing point depressant, such as propylene glycol, and a water dispersible thickening agent for such composition, such as a crosslinked polyacrylic acid polymer. The composition is preferably applied just prior to expected frost onset and serves to lower the freezing point of dew which accumulates on such substrates which have the frost-prevention composition adhered to the substrate surfaces.

22 Claims, No Drawings

PROCESS FOR PREVENTING FROST FORMATION ON PLANTS

BACKGROUND OF THE INVENTION

1. Field of the Invention

The invention relates to a process for preventing or retarding the development of frost on grass or leafy plant surfaces.

2. Description of Related Art

The problem of plant or grass freeze due to overnight frost is well known to the home gardener, the citrus and the golf industries. Frost can occur during the spring, fall and winter months at temperatures below about 38° F. as a consequence of a combination of ambient temperature and the evaporative cooling effect of condensed moisture (dew) which may collect on the grass and plants during the evening or early morning hours. With respect to the golf industry, such frosts cause delays in tee times at golf courses at the start of the day because walking on frozen greens may fracture the grass blades and may ultimately leave brown patches on the grass. The grass is not killed off at the root but does suffer damage that affects the aesthetics of the golfing green and can weaken the grass plant, thus making it more vulnerable to other diseases. In addition, the putting characteristics of a frozen green are obviously different than those of a non-frozen green.

Clearly, delays in tee times while waiting for the grass to thaw can have a significant negative impact on golf course revenues.

Ice release or anti-icing compositions have been disclosed in the prior art to facilitate the removal of frost or ice from various surfaces or structures. For example, U.S. Pat. No. 3,940,356 discloses an ice-release composition adapted to be sprayed on ice or frost-laden horizontal surfaces such as auto windshields, which facilitates the removal of accumulated frost or ice. These compositions comprise an aqueous-based mixture of an alkylene glycol, a crosslinked acrylic polymer used as a gelling agent, a neutralizing base and a $C_1$ to $C_3$ alkanol. U.S. Pat. No. 5,385,688 discloses similar gelled compositions which are pumped into conduits to either prevent ice formation within the conduit or to dissolve ice already formed within the conduit.

Other analogous formulations used as aircraft de-icers are disclosed in U.S. Pat. Nos. 4,358,389, 4,698,172, 4,954,279, 5,118,435 and 5,273,673.

However, this prior art does not address the problem of frost build-up on grass or plant surfaces or techniques for the prevention of or removal of frost with respect to such surfaces.

SUMMARY OF THE INVENTION

The invention provides a process for preventing or retarding frost formation on grass or leafy plants susceptible to frost damage comprising spraying the surface of the grass or leafy plants with a frost prevention composition comprising a mixture of:

a) water b) a water soluble, freezing point depressant for said water, present in said composition in an amount sufficient to lower the freezing point of water by at least about 2° F.; and c) a water dispersible thickening agent for said composition, present in an amount sufficient to cause said composition to adhere to said grass or plant surfaces to a greater extent than an otherwise identical composition which is free of said thickening agent.

The invention more specifically provides a process for preventing or retarding frost formation on the surfaces of golf green grass comprising:

i) providing a frost-prevention composition comprising a mixture of:

a) water;

b) at least 10 wt % of a water soluble hydroxy-functional compound selected from the group consisting of $C_1$ to $C_6$ mono hydric alcohols, $C_2$ to $C_4$ alkylene glycols, polyalkylene glycols where the alkylene group contains 2 to 4 carbon atoms and mixtures thereof;

c) a water dispersible thickening agent for said composition present in said composition in an amount sufficient to provide a composition Brookfield RVT viscosity of at least about 1,000 cps at 10 rpm and room temperature using an RV-6 spindle;

ii) diluting said composition with at least one volume of additional water per volume of said composition; and iii) spraying said diluted composition on the surfaces of grass blades in said golf green.

Ideally, the composition is sprayed on grass or other leafy plants just prior to the onset of an expected overnight frost during the cooler months of the year. Because of the thixotropic nature of the sprayed composition, it tends to cling to these surfaces and prevent the freezing of moisture that condenses or collects on these surfaces overnight. This protection is the result of the lowering of the freezing point of the condensed moisture due to contact and intermixing with the protective composition adhering to the grass or plant surfaces.

DETAILED DESCRIPTION OF THE INVENTION

As set forth above, the composition applied to grass or leafy plant substrates to prevent or retard frost formation comprises an aqueous mixture containing water, a water soluble freezing point depressant for water and a water dispersible thickening agent.

Suitable freezing point depressants include hydroxy functional compounds comprising $C_1$ to $C_6$ mono-hydric alcohols. Examples of such materials include methanol, ethanol, n-propanol, n-butanol, isopropanol, and alkylene glycol monoalkyl ethers such as ethylene glycol monomethyl or monoethyl ethers and propylene glycol monomethyl or monoethyl ethers. Also included are $C_2$ to $C_4$ alkylene glycols such as ethylene, propylene or butylene glycols or glycerine. Polyalkylene glycols wherein the alkylene group contains 2 to 4 carbon atoms may be used, such as polyethylene, polypropylene or polybutylene glycol. Sugar is another freezing point depressant which may be employed, as well as mixtures of two or more different freezing point depressants.

It is preferred to utilize a freezing point depressant which exhibits minimal toxic effect with respect to grass or plants or the surrounding environs. Propylene glycol is a particularly suitable material for use as a freezing point depressant.

The amount of freezing point depressant included in the composition will vary depending on the degree of frost protection desired and whether or not the composition will be further diluted prior to application to a substrate. The amount will generally range from about 5 to about 75 wt %, more preferably from about 10 to about 60 wt % of the composition.

Suitable thickening agents for use in compositions of the present invention are water dispersible materials which may also be water soluble. Examples of such materials include various gel-forming polysaccharides such as carrageenan, guar or xanthan gums; gel forming cellulose and cellulose derivatives such as cellulose ethers, carboxy methylcellulose, hydroxyethylcellulose, hydroxy propylcellulose and the like; gelatin; polymeric thickening agents such as polyacrylamide and copolymers of acrylamide with acrylic or methacrylic acid or their esters; crosslinked polymers of acrylic acid and copolymers of acrylic acid with copolymerizable hydrophobic vinyl monomers such as alkyl acrylates or methacrylates or hydroxy substituted alkyl acylates or methacrylates.

Particularly preferred thickening agents include lightly crosslinked homopolymers and copolymers of acrylic acid having a molecular weight in the range of about 750,000 to about 4,000,000. These polymers are prepared by polymerizing acrylic acid or a mixture of acrylic acid and up to about 35 wt % of a copolymerizable monomer, e.g., an alkyl acrylate or methacrylate, in the presence of a crosslinking agent having two or more $CH_2$=C<groups per molecule, e.g., divinyl benzene or butadiene, as disclosed in U.S. Pat. No. 2,923,692, the complete disclosure of which is incorporated herein by reference.

Crosslinked polyacrylic acid polymers and copolymers of this type are available from B. F. Goodrich Company under the trade designations CARBOPOL® EZ-1, EZ-2, 672, 690, 934, 940, 1610, 1621 and 1622. The most preferred thickener for use in the present invention is CARBOPOL® EZ-1.

The amount of thickener which may be present in the composition will generally range from about 0.01 to about 3.0 wt %, more preferably from about 0.05 to about 1.0 wt %, and most preferably from about 0.05 to about 0.5 wt %.

The amount of thickening agent added to the composition should be such to provide a viscosity in the range of from about 1,000 to about 100,000 centipoise (cps) more preferably from about 10,000 to about 90,000 cps and most preferably from about 25,000 to about 80,000 cps as measured at room temperature using a Brookfield Model RVT Viscometer, RV-6 spindle, and at 10 RPM. Preferred compositions will have a Thixotropic Index (Visc. at 10 RPM/ Visc. at 1 RPM) in the range of 4 to 5, more preferably in the range of 4.1 to 4.7.

Where the thickening agent is an acidic polymer having free carboxylic functionality, a basic neutralizing agent is also added to the composition in amounts sufficient to neutralize at least 20%, preferably from 30 to 80%, of the free carboxylic acid groups and to raise the pH of the composition to about 5 to 8, at which point thickening of the composition will rapidly occur. Suitable neutralizing agents include inorganic bases such as sodium, potassium or ammonium hydroxide or organic amine bases such as alkyl amines or alkanolamines. Where used, these bases are added to the composition at levels of from about 0.5 up to about 3 wt %.

The composition may also contain one or a mixture of water soluble fertilizers which are specifically beneficial with respect to grass or plants of the type to be protected. Suitable compounds include nitrogen-containing compounds such as urea, ammonium nitrate or ammonium chloride, as well as phosphorous-containing compounds. The presence of these materials will also contribute a freezing point depressant property to the aqueous composition. Where used, the fertilizer may be present at a level of from about 0.1 to about 10 wt % of the composition.

The composition may also contain other additives such as wetting agents, antioxidants, dyes and the like. The presence of a water soluble green dye in the composition at a level of up to about 0.5 wt % will enhance the appearance of grass or other green plants to which the composition is applied.

The composition will generally contain from about 25 to less than about 95 wt % water, more preferably from about 35 to less than about 90 wt % water. Deionized water is preferred.

The composition may be formulated by mixing the components at room temperature or at higher temperatures if necessary to disperse and solubilize the components. A preferred mixing technique is to first form a mixture of water, preferably deionized water, and the water soluble freezing point depressant, as well as any other ingredients, and then disperse the thickening agent into this mixture under mixing conditions. Where the thickening agent is a crosslinked acrylic polymer, sufficient base is subsequently added to sufficiently neutralize the polymer, causing thickening of the mixture to occur.

The degree of frost protection and the viscosity of the thickened or gelled composition will vary as a function of the amounts of freezing point depressant and thickening agent respectively present in the composition. For example, compositions containing as little as about 5 wt % propylene glycol and 0.05 to 0.1 wt % of CARBOPOL® EZ-1 applied without dilution to grass will provide a coating which has a freezing point of about 30° F. (2° F. lower than the freezing point of pure water) and which adheres to the surfaces of the grass blades with minimal run off. Table 1 illustrates the approximate protection temperatures for formulations containing various quantities of propylene glycol mixed with water.

TABLE 1

| Protection Temp. (°F.) | Glycol Content (wt %) |
| --- | --- |
| 30 | 5 |
| 27 | 10 |
| 24 | 15 |
| 21 | 20 |
| 17 | 25 |
| 13 | 30 |
| 3 | 40 |
| −12 | 50 |

In the preferred embodiment, the frost protection composition is provided as a concentrate adapted to be diluted with water by the consumer prior to use. The amount of water added by the consumer will vary as a function of the degree of frost protection desired which will in turn be dictated by the severity of any overnight frost which is expected. For example, a concentrate containing equal parts by weight propylene glycol and water could be diluted with 9 volumes of water per 1 volume of concentrate to provide light frost or 30° F. protection as shown in Table 1. The same concentrate could also be diluted with as little as 2 volumes of water per one volume of concentrate to provide heavier frost protection, or 24° F. protection as also shown in Table 1. Thus, the degree of desired protection based on anticipated frost conditions will vary as a function of the extent of water dilution of the concentrate prior to application to the surfaces to be protected.

The protective composition may be applied using any suitable device used to spray liquids on grass or plants, e.g., a pressurized fertilizer tank or an ordinary garden hose connected to a pumping tank containing the diluted or non-diluted composition.

A preferred technique for application of diluted concentrates is the use of a spray nozzle in combination with an aspirator tank wherein selected quantities of concentrate are diluted with a pressurized flow of water in the spray nozzle section of a hose. These devices are well known in the art and may contain a regulating valve such that the volume of concentrate mixed with the flow of water can be roughly controlled. The spray nozzle should be adjusted such that the spray of liquid is as fine as possible to assure uniform application of the protective composition to grass or leafy plant substrates in amounts just sufficient to form a thin, adherent coating on their surfaces.

The following example is illustrative of the invention.

EXAMPLE 1

A fifteen percent by weight (15 wt %) solution of propylene glycol (Mol. Wt. 76) in deionized water was prepared by adding 540 gm (7.1 mole) propylene glycol to 3060 gm (3.06 Kilogram) deionized water. The propylene glycol is completely soluble and a clear, low viscosity solution resulted. The solution had a viscosity of about 15 centipoise as measured with a Brookfield RVT Viscometer using an RV #1 spindle at 50 RPM.

This solution is equivalent to one containing 2.32 mole of propylene glycol per kilogram of solvent, or 2.32 Molal (Molality is defined as moles solute per kilogram solvent). Such a solution would have a Freezing Point of −4.32 degrees Celsius or 24.2 degrees Fahrenheit based on the published Molal Freezing Point Depression Constant for water of 1.86 deg. C kg-solvent/mol-solute (*Fundamentals of Chemistry*, Brady/Holum, John Wiley & Sons, 1981, page 365, Table 11.6).

To a 3 Kilogram portion of the above solution was added 9.0 gm (0.3 wt %) of a polyacrylic acid thickening agent manufactured by BF Goodrich and sold under the tradename Carbopol™ EZ-1. The powdered thickening agent was dispersed into the solution by mixing by hand with a stirring paddle for two minutes. To the dispersion was added 20 milliliters of a 50 wt % solution of triethanolamine in water. Upon stirring, the dispersion clarified into a clear liquid solution and rapidly formed a thick, viscous gel.

Using a Brookfield Model RVT Viscometer and an RV-6 spindle, the viscosity was measured to be 280,000 centipoise at 1 RPM and 65,000 centipoise at 10 RPM (at room temperature), resulting in a thixotropic index (Visc. at 10 RMP/Visc. at 1 RPM) of 4.3.

In the evening of a day where the air temperature was in excess of 40° F. and fell to below 32° F. prior to morning of the next day, the gelled composition prepared as above was applied to a section of an open grass plot mowed to a height of 1 inch above the ground. The composition was applied as a fine spray using a hand held 2 gallon pressurized garden sprayer and evenly applied to the surfaces of the grass stalks. The gel did not run, drip or sag from the grass surfaces to any significant degree.

In the morning it was noted that frost had formed on all open areas of the grass plot except the section of the plot treated as above, which remained free of visible frost. The gel coating was subsequently washed from the grass surfaces with a mild mist of water spray and no apparent damage to the grass was evident.

What is claimed is:

1. A process for preventing or retarding frost formation on grass or leafy plant substrates susceptible to frost damage comprising spraying the surface of said substrate with a frost-prevention composition comprising a mixture of:

a) water;

b) a water soluble freezing point depressant for said water, present in said composition in an amount sufficient to lower the freezing point of water by at least about 2° F.; and c) a water dispersible thickening agent for said composition, present in an amount sufficient to cause said composition to adhere to said grass or plant surfaces to a greater extent than an otherwise identical composition which is free of said thickening agent.

2. The process of claim 1 wherein said freezing point depressant is a hydroxy-functional compound selected from the group consisting of $C_1$ to $C_6$ mono-hydric alcohols, $C_2$ to $C_4$ alkylene glycols, polyalkylene glycols wherein the alkylene groups contain 2 to 4 carbon atoms, sugar and mixtures thereof.

3. The process of claim 2 wherein said hydroxy-functional compound is a $C_2$ or $C_3$ alkylene glycol.

4. The process of claim 3 wherein said alkylene glycol is propylene glycol.

5. The process of claim 1, wherein said thickening agent is selected from the group consisting of gel-forming polysaccharides, gel-forming celluloses, gelatin and gel-forming acrylic polymers.

6. The process of claim 1 wherein said thickening agent comprises a crosslinked acrylic acid polymer.

7. The process of claim 6 wherein said crosslinked acrylic acid polymer comprises a polyacrylic acid having a molecular weight in the range of from about 750,000 to about 4,000,000.

8. The process of claim 6 wherein said composition further contains an inorganic base or organic amine base present in said composition in an amount sufficient to neutralize at least 20% of the free carboxylic acid groups present in said polymer.

9. The process of claim 1 wherein said composition contains from about 5 to about 75 wt % of said freezing point depressant.

10. The process of claim 9 wherein said composition contains at least about 10 wt % of said freezing point depressant, and wherein said composition is diluted with additional water prior to spraying the surface of said grass or leafy plants.

11. The process of claim 1 wherein said thickening agent is present in said composition at a level of from about 0.01 to about 3.0 wt %.

12. The process of claim 6 wherein said acrylic acid polymer is present in said composition at a level of from about 0.05 to about 0.5 wt %.

13. The process of claim 1 wherein said composition has a viscosity in the range of 5,000 to 100,000 cps as measured using a Brookfield Model RTV viscometer at room temperature, RV-6 spindle at 10 RPM.

14. The process of claim 1 wherein said composition further comprises a water soluble fertilizer.

15. The process of claim 1 wherein said substrate is golf green grass.

16. A process of preventing or retarding frost formation on the surfaces of golf green grass comprising:

i) providing a frost-prevention composition comprising a mixture of:

a) water b) at least 10 wt % of a water soluble freezing point depressant for said water, present in said composition in an amount sufficient to lower the freezing point of water by at least about 2° F.;

c) a water dispersible thickening agent for said composition present in said composition in an amount sufficient to provide a composition Brookfield RVT viscosity of at least about 1,000 cps at 10 rpm and room temperature using an RV-6 spindle;

ii) diluting said composition with at least one volume of additional water per volume of said composition; and iii) spraying said diluted composition on the surfaces of grass blades in said golf green.

17. The process of claim 16 wherein said dilution occurs in a mixing spray nozzle of a hose.

18. The process of claim 16 wherein said freezing point depressant is a hydroxy-functional compound selected from the group consisting of $C_1$ to $C_6$ mono-hydric alcohols, $C_2$ to $C_4$ alkylene glycols, polyalkylene glycols wherein the alkylene groups contain 2 to 4 carbon atoms, sugar and mixtures thereof.

19. The process of claim 18 wherein said thickening agent is a crosslinked acrylic acid polymer present in said composition at a level of from about 0.01 to about 1.0 wt %.

20. The process of claim 18 wherein said composition has a viscosity in the range of from about 5,000 to 100,000 cps as measured using a Brookfield Model RTV viscometer at room temperature, RV-6 spindle and at 10 RPM.

21. The process of claim 20 wherein said viscosity is in the range of about 25,000 to 80,000 cps.

22. The process of claim 18 wherein said water soluble, hydroxy functional compound is propylene glycol present in said composition at a level of from about 10 to about 60 wt %.

* * * * *